US012759547B2

(12) United States Patent
Inoue et al.

(10) Patent No.: US 12,759,547 B2
(45) Date of Patent: Oct. 13, 2026

(54) LANE DEPARTURE INTENTION ESTIMATION DEVICE

(71) Applicant: TOYOTA JIDOSHA KABUSHIKI KAISHA, Toyota (JP)

(72) Inventors: Shintaro Inoue, Naka-gun (JP); Yosuke Tashiro, Hadano (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 19 days.

(21) Appl. No.: 18/941,485

(22) Filed: Nov. 8, 2024

(65) Prior Publication Data

US 2025/0249899 A1 Aug. 7, 2025

(30) Foreign Application Priority Data

Feb. 7, 2024 (JP) ................................ 2024-016964

(51) Int. Cl.

*B60W 30/12* (2020.01)
*B60W 50/00* (2006.01)
*B60W 50/14* (2020.01)

(52) U.S. Cl.

CPC ........ *B60W 30/12* (2013.01); *B60W 50/0097* (2013.01); *B60W 50/14* (2013.01); *B60W 2540/229* (2020.02)

(58) Field of Classification Search

CPC .. B60W 30/12; B60W 50/0097; B60W 50/14; B60W 2540/229; B60W 2420/403; B60W 2540/225; B60W 30/18163

See application file for complete search history.

(56) References Cited

U.S. PATENT DOCUMENTS

| | | | |
|---|---|---|---|
| 7,692,534 | B2 | 4/2010 | Kataoka et al. |
| 8,352,124 | B2 | 1/2013 | Taguchi |
| 8,682,500 | B2 | 3/2014 | Sakugawa |
| 8,818,634 | B2 | 8/2014 | Fujita et al. |
| 9,168,953 | B2 | 10/2015 | Mitsumoto et al. |
| 9,714,034 | B2 | 7/2017 | Otake et al. |
| 9,880,558 | B2 | 1/2018 | Nakamura |
| 9,902,399 | B2 | 2/2018 | Torii et al. |
| 10,345,443 | B2 | 7/2019 | Masui et al. |

(Continued)

FOREIGN PATENT DOCUMENTS

JP 2022077931 A 5/2022

*Primary Examiner* — Stephanie T Su

(74) *Attorney, Agent, or Firm* — Hunton Andrews Kurth LLP

(57) ABSTRACT

A lane departure intention estimation device includes: an estimation section that estimates that a driver of a subject vehicle has no lane departure intention in a case where the driver is in a distracted state or a non-awake state; and a prediction section that uses a learned machine learning model to predict whether or not the driver has a lane departure intention based on a time-series signal and a first classification signal in a case where the driver is in neither the distracted state nor the non-awake state. The time-series signal includes vehicle information, lane information, and target information. The first classification signal includes a signal indicating that the driver is in neither the distracted state nor the non-awake state. The learned machine learning model is obtained by learning in which a learning time-series signal and a data set of a learning first classification signal and a label are used.

12 Claims, 5 Drawing Sheets

(56) References Cited

U.S. PATENT DOCUMENTS

| | | | | |
|---|---|---|---|---|
| 10,611,240 | B2 | 4/2020 | Masui et al. | |
| 2019/0071091 | A1* | 3/2019 | Zhu | B60W 10/06 |
| 2019/0135303 | A1* | 5/2019 | Kim | B60W 50/0098 |
| 2020/0202151 | A1* | 6/2020 | Wacquant | G06V 40/174 |
| 2022/0379900 | A1* | 12/2022 | Kuehnle | B60W 10/04 |
| 2025/0222934 | A1* | 7/2025 | Ren | G06V 40/10 |

* cited by examiner

LANE DEPARTURE INTENTION ESTIMATION DEVICE

CROSS-REFERENCE TO RELATED APPLICATION

This application claims priority to Japanese Patent Application No. 2024-016964 filed on Feb. 7, 2024, incorporated herein by reference in its entirety.

BACKGROUND

1. Technical Field

The present disclosure relates to a lane departure intention estimation device.

2. Description of Related Art

Japanese Unexamined Patent Application Publication No. 2022-077931 describes a driving assist device that deactivates a lane departure prevention function on the condition that an intention to change lanes is determined during the execution of the lane departure prevention. In addition, JP 2022-077931 A describes that what detects the movement of the line of sight, a gesture, or the like of a driver acquired by image input means such as various input switches and cameras is usable as an intention determination section that determines an intention of the driver to change lanes.

SUMMARY

JP 2022-077931 A, however, describes nothing about a specific technique that determines the presence or absence of an intention of a driver to change lanes from a result of the detection of the movement of the line of sight, a gesture, or the like of the driver. It may be, therefore, impossible to appropriately estimate by the technology described in JP 2022-077931 A whether or not the driver has a lane departure intention.

In view of the problem, an object of the present disclosure is to provide a lane departure intention estimation device that makes it possible to appropriately estimate whether or not a driver of a subject vehicle has a lane departure intention.

(1) An aspect of the present disclosure is a lane departure intention estimation device including: an estimation section; and a prediction section. The estimation section estimates that a driver of a subject vehicle has no lane departure intention in a case where the driver of the subject vehicle is in a distracted state or a non-awake state. The prediction section uses a learned machine learning model to predict whether or not the driver of the subject vehicle has a lane departure intention based on a time-series signal and a first classification signal in a case where the driver of the subject vehicle is in neither the distracted state nor the non-awake state. The time-series signal includes vehicle information that is information regarding the subject vehicle, lane information that is information regarding the lane in which the subject vehicle is traveling, and target information that is information regarding a target present around the subject vehicle. The first classification signal includes a signal indicating that the driver of the subject vehicle is in neither the distracted state nor the non-awake state. The learned machine learning model is obtained by learning in which a learning time-series signal and learning data are used. The learning time-series signal includes learning vehicle information that is information regarding a learning vehicle, learning lane information that is information regarding the lane in which the learning vehicle is traveling, and learning target information that is information regarding a target present around the learning vehicle. The learning data is a data set of a learning first classification signal and a label. The learning first classification signal indicates that a driver of the learning vehicle is in neither the distracted state nor the non-awake state. The label indicates whether or not the driver of the learning vehicle has a lane departure intention.

(2) The lane departure intention estimation device according to (1) may include a control section that causes an output of a lane departure alert to be restricted in a case where the prediction section predicts that the driver of the subject vehicle has a lane departure intention. The lane departure alert is an alert for a lane departure of the subject vehicle.

(3) The lane departure intention estimation device according to (1) may include a control section that causes the execution of a lane keeping assist to be restricted in a case where the prediction section predicts that the driver of the subject vehicle has a lane departure intention.

(4) The lane departure intention estimation device according to (1) may include a driver monitor section that outputs the first classification signal and a second classification signal based on an image captured by a driver monitor camera. The image includes the driver of the subject vehicle. The first classification signal includes the signal indicating that the driver of the subject vehicle is in neither the distracted state nor the non-awake state. The second classification signal includes a signal indicating that the driver of the subject vehicle is in the distracted state or the non-awake state. In a case where the driver monitor section outputs the second classification signal including the signal indicating that the driver of the subject vehicle is in the distracted state or the non-awake state and the prediction section predicts that the driver of the subject vehicle has a lane departure intention, a result of the estimation by the estimation section may be given priority over a result of the prediction by the prediction section. The result of the estimation indicates that the driver of the subject vehicle has no lane departure intention. The result of the prediction indicates that the driver of the subject vehicle has a lane departure intention.

(5) In the lane departure intention estimation device according to (4), the first classification signal output from the driver monitor section may be input to the prediction section. The first classification signal may include a signal indicating the internal state of the driver of the subject vehicle. The internal state is estimated by the driver monitor section based on the image captured by the driver monitor camera. The image includes the driver of the subject vehicle.

According to the present disclosure, it is possible to appropriately estimate whether or not a driver of a subject vehicle has a lane departure intention.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of a lane departure intention estimation device according to the present disclosure will be described with reference to the drawings.

First Embodiment

Figure 1:
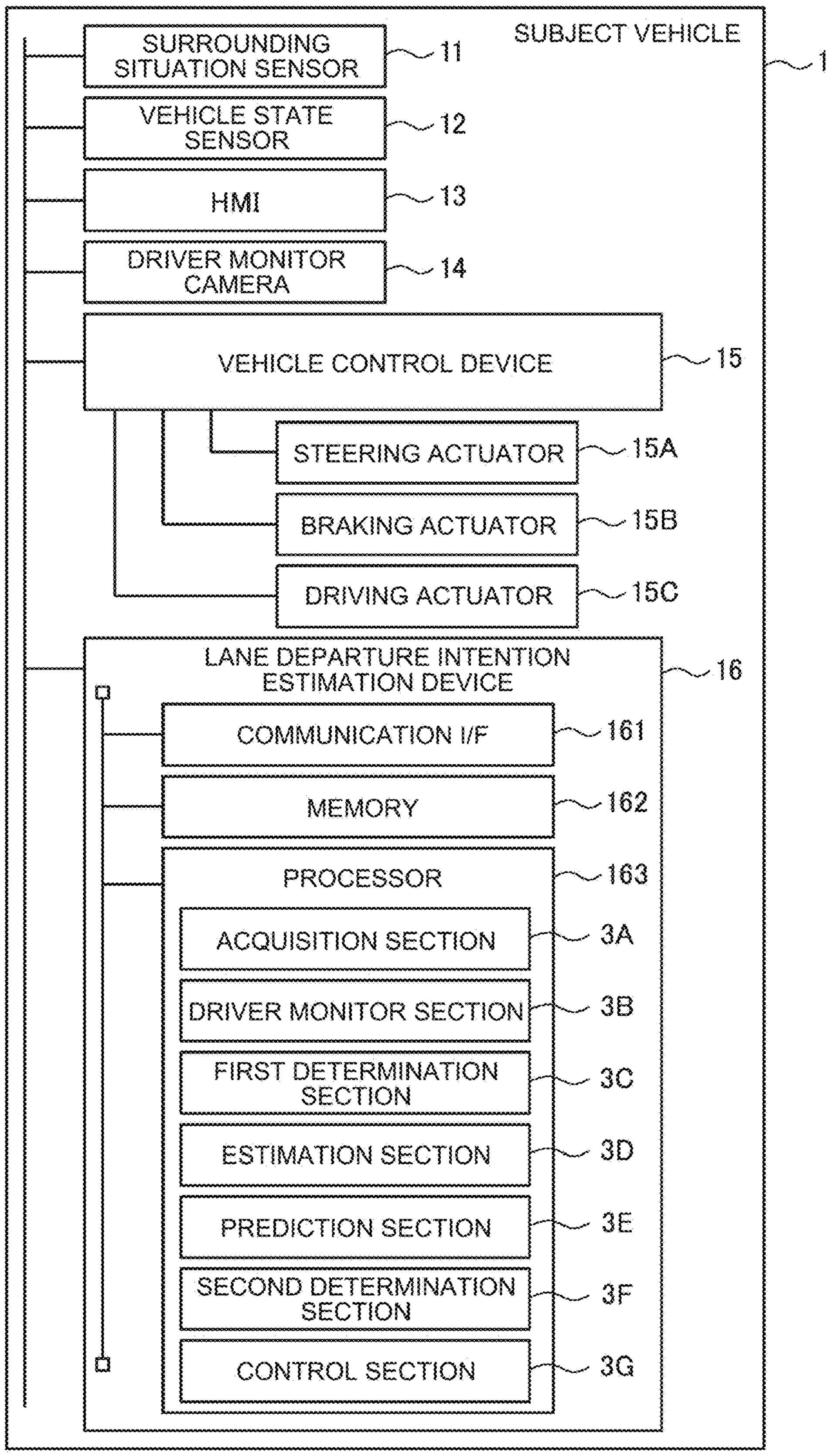
FIG. 1 is a diagram illustrating an example of a subject vehicle 1 to which a lane departure intention estimation device 16 according to a first embodiment is applied.

FIG. 1 is a diagram illustrating an example of a subject vehicle 1 to which a lane departure intention estimation device 16 according to a first embodiment is applied. In the example illustrated in FIG. 1, the subject vehicle 1 includes a surrounding situation sensor 11, a vehicle state sensor 12, a human machine interface (HMI) 13, a driver monitor camera 14, a vehicle control device 15, a steering actuator 15A, a braking actuator 15B, a driving actuator 15C, and the lane departure intention estimation device 16. The surrounding situation sensor 11 detects a lane line that defines the lane in which the subject vehicle 1 is traveling and a target (e.g., a nearby vehicle, an obstacle, or the like) present around the subject vehicle 1 and transmits a result of the detection to the vehicle control device 15 and the lane departure intention estimation device 16. The surrounding situation sensor 11 includes, for example, a camera that images the front area or the like of the subject vehicle 1, a light detection and ranging (LiDAR), a radar, a sonar, and the like. The result of the detection by the surrounding situation sensor 11 includes, for example, lane information that is information regarding the lane in which the subject vehicle 1 is traveling, target information that is information regarding a target present around the subject vehicle 1, and the like. The lane information includes, for example, information indicating the position of a lane line in the horizontal direction in a camera image, the curve curvature of the lane in which the subject vehicle 1 is traveling, or the like. The target information includes, for example, information indicating the position, the speed, or the like of the target relative to the subject vehicle 1.

The vehicle state sensor 12 detects the state of the subject vehicle 1 and transmits a result of the detection to the vehicle control device 15 and the lane departure intention estimation device 16. The vehicle state sensor 12 includes, for example, a vehicle speed sensor, a steering torque sensor, and the like. The result of the detection by the vehicle state sensor 12 includes, for example, vehicle information that is information regarding the subject vehicle 1, or the like. The vehicle information includes, for example, vehicle speed, steering torque, and the like.

The HMI 13 has a function of receiving various operations of a driver of the subject vehicle 1, a function of outputting information such as an alert by displaying the information or reproducing the sound of the information for the driver of the subject vehicle 1, or the like. The HMI 13 transmits a signal indicating an operation of the driver of the subject vehicle 1 to the vehicle control device 15. The alert output by the HMI 13 includes, for example, a lane departure alert (LDA) that is an alert for a departure of the subject vehicle 1 from the lane in which the subject vehicle 1 is traveling.

The driver monitor camera 14 is disposed, for example, at the upper part of the steering column of the subject vehicle 1 and images the face and a part of the upper half of the body of a driver of the subject vehicle 1. In addition, the driver monitor camera 14 transmits the captured image data to the lane departure intention estimation device 16. In another example, the driver monitor camera 14 may be disposed, for example, at a position such as the center cluster, the rear-view mirror, the meter panel, or the meter hood of the subject vehicle 1 other than the steering column.

In the example illustrated in FIG. 1, the vehicle control device 15 controls the traveling of the subject vehicle 1. The vehicle control device 15 includes, for example, a driving assist electronic control unit (ECU) and controls the steering actuator 15A, the braking actuator 15B, and the driving actuator 15C based on information (data and signals) transmitted from the surrounding situation sensor 11, the vehicle state sensor 12, the HMI 13, and the lane departure intention estimation device 16.

The lane departure intention estimation device 16 includes, a microcomputer including a communication interface (I/F) 161, a memory 162, and a processor 163. The communication interface 161 includes an interface circuit. The memory 162 stores a program and various kinds of data that are used in processing executed by the processor 163. The processor 163 has functions of an acquisition section 3A, a driver monitor section 3B, a first determination section 3C, an estimation section 3D, a prediction section 3E, a second determination section 3F, and a control section 3G. The acquisition section 3A acquires a result (such as lane information or target information) of detection by the surrounding situation sensor 11, a result (such as vehicle information) of detection by the vehicle state sensor 12, the data of an image (driver monitor camera image) captured by the driver monitor camera 14, and the like.

The driver monitor section 3B measures the state of a driver of the subject vehicle 1 based on an image captured by the driver monitor camera 14, or the like. Specifically, the driver monitor section 3B senses the position and the direction of the face of the driver of the subject vehicle 1 and the open or closed state of the eyes and determines whether or not the driver of the subject vehicle 1 is in a state in which it is possible for the driver to check the surrounding situation and perform a driving operation. For example, the driver monitor section 3B estimates the drowsiness degree of the driver of the subject vehicle 1 by using a driver monitor camera image to detect a face region, detect a facial part, estimate the head attitude, detect the eye opening rate, and analyze an eyelid behavior.

In a case where the driver monitor section 3B determines that the driver of the subject vehicle 1 in a non-awake state, the driver monitor section 3B outputs a non-awake signal indicating that the driver of the subject vehicle 1 is in the non-awake state as a driver monitor signal. Meanwhile, in a case where the driver monitor section 3B determines that the driver of the subject vehicle 1 is in an eyes-open state, the driver monitor section 3B outputs an eyes-open signal indicating that the driver of the subject vehicle 1 is in the eyes-open state as a driver monitor signal. In addition, in a case where the driver monitor section 3B determines that the driver of the subject vehicle 1 is in a distracted state, the driver monitor section 3B outputs a distraction signal (the distraction signal is one of face direction signals) indicating that the driver of the subject vehicle 1 is in the distracted state as a driver monitor signal. The non-awake signal, the eyes-open signal, and the distraction signal (face direction signal) belong to "strong signals (e.g., such as signals for an artificial intelligence (AI) used as the driver monitor section 3B to output high reliability)".

In a case where the driver of the subject vehicle 1 has a line of sight outside the field of view within which safety has to be checked, for example, toward the passenger seat, a car navigation, or the like, the driver monitor section 3B outputs a distraction signal. In addition, in a case where the driver of the subject vehicle 1 has a line of sight on only the left side for a predetermined time while the subject vehicle 1 is traveling in the left lane of a straight road having two lanes on each side, the driver monitor section 3B outputs a distraction signal. That is, in a case where the driver of the subject vehicle 1 does not cast a line of sight on a target that is necessary to be checked, the driver monitor section 3B outputs a distraction signal.

In addition, in a case where the driver monitor section 3B determines that the driver of the subject vehicle 1 is gazing at a target present around the subject vehicle 1 based on an image captured by the driver monitor camera 14 and a result of detection by the surrounding situation sensor 11, the driver monitor section 3B outputs a signal (a signal (gaze target information) indicating a target at which the driver of the subject vehicle 1 is gazing) indicating the line-of-sight direction of the driver of the subject vehicle 1 as a driver monitor signal. Furthermore, in a case where the driver monitor section 3B determines that the driver of the subject vehicle 1 has a high stress level, the driver monitor section 3B outputs a signal indicating that the driver of the subject vehicle 1 has a high stress level as a driver monitor signal. In addition, in a case where the driver monitor section 3B determines that the driver of the subject vehicle 1 in a careless state, the driver monitor section 3B outputs a signal indicating that the driver of the subject vehicle 1 is in the careless state as a driver monitor signal. The signal indicating the line-of-sight direction of the driver of the subject vehicle 1, the signal indicating that the driver of the subject vehicle 1 has a high stress level, and the signal indicating that the driver of the subject vehicle 1 is in the careless state belong to "weak signals (e.g., such as signals for the AI used as the driver monitor section 3B to output low reliability)".

The driver monitor section 3B outputs, for example, a weak signal such as a signal (a signal indicating a target at which the driver of the subject vehicle 1 is gazing) indicating the line-of-sight direction of the driver of the subject vehicle 1, a signal indicating that the driver of the subject vehicle 1 has a high stress level, or a signal indicating that the driver of the subject vehicle 1 is in the careless state as a "first classification signal". In addition, the driver monitor section 3B outputs, for example, a strong signal such as a non-awake signal, an eyes-closed signal, or a distraction signal (face direction signal) as a "second classification signal". For example, a signal indicating the line-of-sight direction of the driver of the subject vehicle 1 (a signal indicating a target at which the driver of the subject vehicle 1 is gazing) or the other signals included in the "first classification signal" each correspond to a signal indicating that the driver of the subject vehicle 1 is in neither the distracted state nor the non-awake state.

The first determination section 3C determines whether or not a driver of the subject vehicle 1 is in the distracted state based on a strong signal (second classification signal) output from the driver monitor section 3B. In addition, the first determination section 3C determines whether or not a driver of the subject vehicle 1 is in the non-awake state based on a strong signal (second classification signal) output from the driver monitor section 3B.

When the subject vehicle 1 departs from the lane in which the subject vehicle 1 is traveling, the estimation section 3D estimates whether or not a driver of the subject vehicle 1 has a lane departure intention. If described in detail, in a case where the first determination section 3C determines that the driver of the subject vehicle 1 is in the distracted state, the estimation section 3D estimates that the driver of the subject vehicle 1 has no lane departure intention. In addition, in a case where the first determination section 3C determines that the driver of the subject vehicle 1 is in the non-awake state, the estimation section 3D estimates that the driver of the subject vehicle 1 has no lane departure intention. In contrast, in a case where the first determination section 3C determines that the driver of the subject vehicle 1 is in neither the distracted state nor the non-awake state (e.g., such as a case where the driver of the subject vehicle 1 is looking ahead, but it is not known whether or not the driver of the subject vehicle 1 intentionally causes the subject vehicle 1 to depart from the lane), the estimation section 3D outputs a result of estimation indicating that it is unknown whether or not the driver of the subject vehicle 1 has a lane departure intention.

The prediction section 3E predicts whether or not a driver of the subject vehicle 1 has a lane departure intention based on a weak signal (first classification signal) output from the driver monitor section 3B. For example, in a case where the driver monitor section 3B outputs a first classification signal (weak signal) indicating that the driver of the subject vehicle 1 is in neither the distracted state nor the non-awake state, the prediction section 3E predicts whether or not the driver of the subject vehicle 1 has a lane departure intention. If described in detail, the prediction section 3E uses a learned machine learning model to predict whether or not the driver of the subject vehicle 1 has a lane departure intention based on a time-series signal including vehicle information, lane information, and target information, and a first classification signal.

The learned machine learning model is obtained by learning in which a learning time-series signal and learning data are used. The learning time-series signal includes learning vehicle information that is information regarding a learning vehicle (not illustrated), learning lane information that is information regarding the lane in which the learning vehicle is traveling, and learning target information that is information regarding a target present around the learning vehicle. The learning data is a data set of a learning first classification signal and a label. The learning first classification signal indicates that a driver of the learning vehicle is in neither the distracted state nor the non-awake state. The label indicates whether or not the driver of the learning vehicle has a lane departure intention.

For example, in a case where the subject vehicle 1 travels by avoiding an obstacle (e.g., such as a vehicle parked on the road) in the lane in which the subject vehicle 1 is traveling, a case where, when passing a heavy duty vehicle traveling in the opposing lane, the subject vehicle 1 travels by avoiding the heavy duty vehicle, a case where the subject vehicle 1 changes lanes, or the like, the prediction section 3E predicts that the driver of the subject vehicle 1 has a lane departure intention.

Figure 2B:
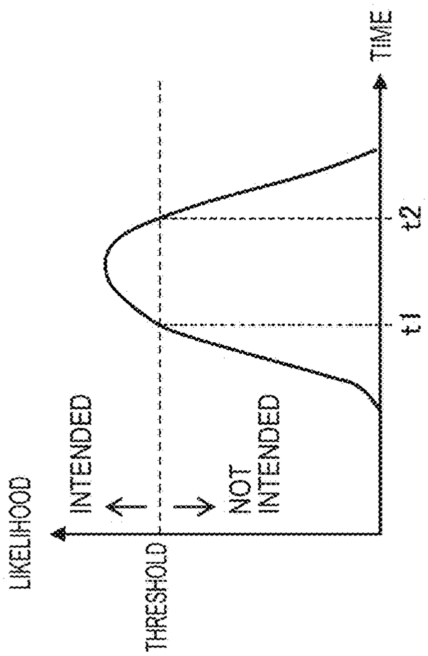
FIG. 2B is a diagram illustrating an example of the configuration or the like of the prediction section 3E.
Figure 2A:
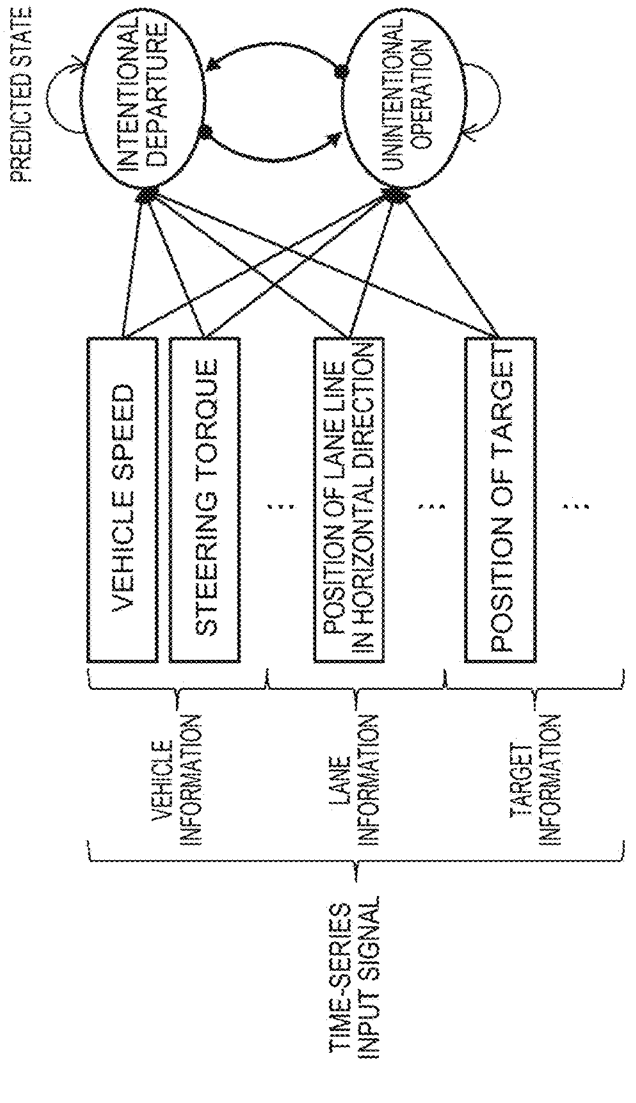
FIG. 2A is a diagram illustrating an example of a configuration or the like of a prediction section 3E.

Each of FIGS. 2A and 2B is a diagram illustrating an example of a configuration or the like of the prediction section 3E. If described in detail, FIG. 2A illustrates an example of a configuration of the prediction section 3E and FIG. 2B illustrates an example of the relationship between likelihood (longitudinal axis in FIG. 2B) output from the prediction section 3E and time (transverse axis in FIG. 2B). In the example illustrated in FIGS. 2A and 2B, the prediction section 3E uses a hidden Markov model as a machine learning model, but the prediction section 3E may use a machine learning model other than the hidden Markov model as a machine learning model in another example.

In the example illustrated in FIGS. 2A and 2B, the prediction section 3E uses a learned machine learning model to output likelihood indicating the validity of the prediction that the driver of the subject vehicle 1 has a lane departure intention as a result of computational processing in a hidden layer. In a case where the likelihood is greater than a threshold (during the period from time t1 to time t2 in FIG. 2B), the prediction section 3E predicts that the driver of the subject vehicle 1 has a lane departure intention and sets a flag to "1 (indicating that the lane departure is intended)". In a case where the likelihood is less than or equal to the threshold (during the period before time t1 and the period after time t2 in FIG. 2B), the prediction section 3E predicts that the driver of the subject vehicle 1 has no lane departure intention and sets the flag to "0 (indicating that the lane departure is not intended)".

In the example illustrated in FIG. 1, a first classification signal (weak signal) output from the driver monitor section 3B is input to the prediction section 3E as described above. The first classification signal includes signals (e.g., information indicating the line-of-sight direction of the driver of the subject vehicle 1, information indicating that the driver of the subject vehicle 1 has a high stress level, and the like) indicating the internal state of the driver of the subject vehicle 1 estimated by the driver monitor section 3B based on an image captured by the driver monitor camera 14. The signals are input to the prediction section 3E in combination with another first classification signal (e.g., such as a signal indicating that the driver of the subject vehicle 1 is in the careless state), thereby allowing the prediction accuracy of the prediction section 3E to increase.

The second determination section 3F determines whether or not the prediction section 3E predicts that the driver of the subject vehicle 1 has a lane departure intention.

In a case where the estimation section 3D estimates that the driver of the subject vehicle 1 has no lane departure intention when the subject vehicle 1 departs from the lane in which the subject vehicle 1 is traveling, the control section 3G causes the HMI 13 to output a lane departure alert. In addition, in a case where the prediction section 3E predicts that the driver of the subject vehicle 1 has no lane departure intention when the subject vehicle 1 departs from the lane in which the subject vehicle 1 is traveling, the control section 3G causes the HMI 13 to output a lane departure alert. Meanwhile, in a case where the prediction section 3E predicts that the driver of the subject vehicle 1 has a lane departure intention when the subject vehicle 1 departs from the lane in which the subject vehicle 1 is traveling, the control section 3G causes the HMI 13 to restrict an output of a lane departure alert.

In the example illustrated in FIG. 1, when the subject vehicle 1 departs from the lane in which the subject vehicle 1 is traveling, the estimation section 3D may estimate that the driver of the subject vehicle 1 has no lane departure intention based on a "second classification signal" output from the driver monitor section 3B, and the prediction section 3E may concurrently predict that the driver of the subject vehicle 1 has a lane departure intention based on a "first classification signal" output from the driver monitor section 3B in some cases.

In such a case, the control section 3G gives priority to a result of the estimation by the estimation section 3D indicating that the driver of the subject vehicle 1 has no lane departure intention over a result of the prediction by the prediction section 3E indicating that the driver of the subject vehicle 1 has a lane departure intention, and causes the HMI 13 to output a lane departure alert.

Figure 3:
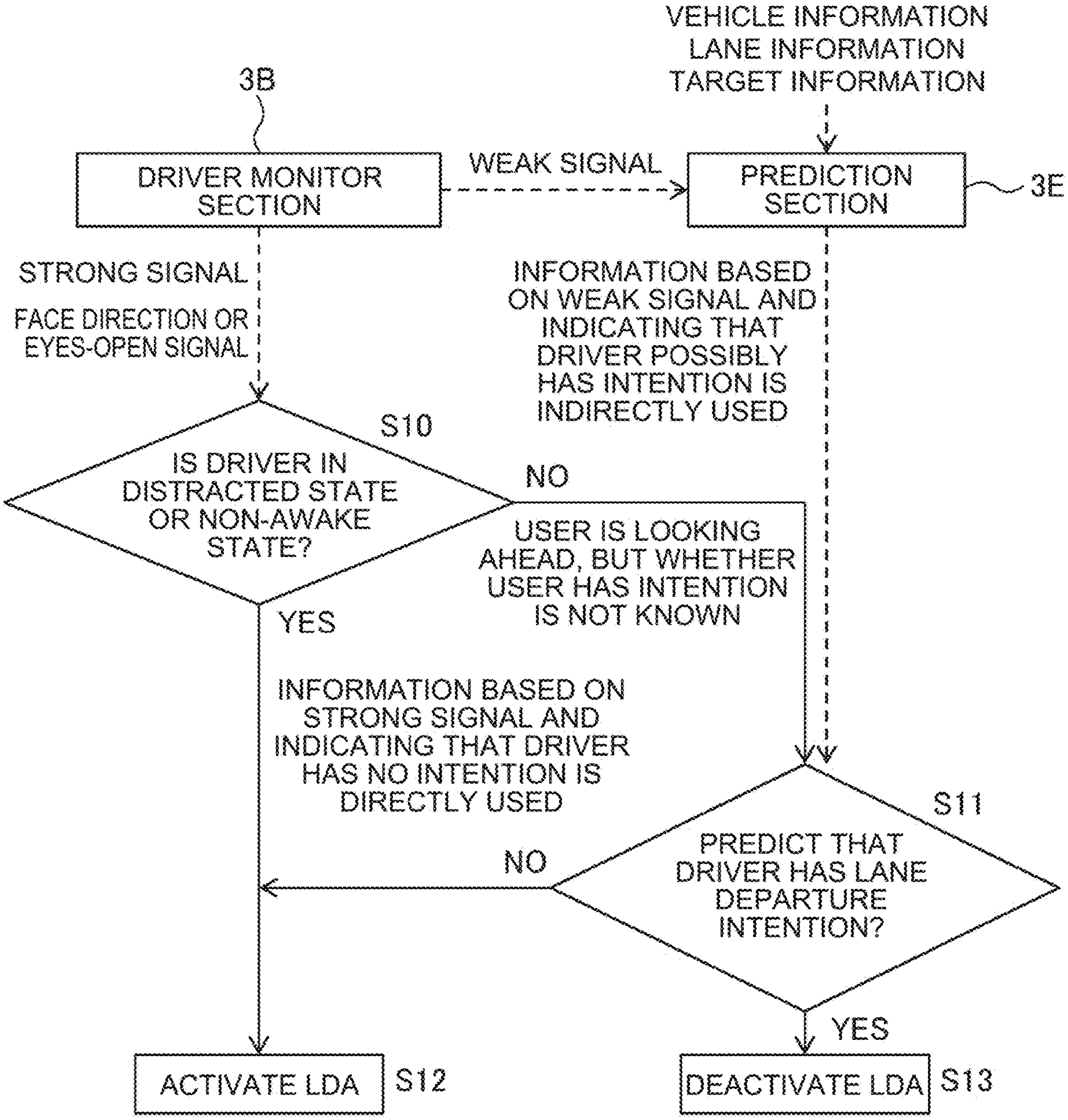
FIG. 3 is a diagram for describing an example of processing that is executed by a processor 163 of the lane departure intention estimation device 16 according to the first embodiment when the subject vehicle 1 departs from a lane in which the subject vehicle 1 is traveling.

FIG. 3 is a diagram for describing an example of processing that is executed by the processor 163 of the lane departure intention estimation device 16 according to the first embodiment when the subject vehicle 1 departs from the lane in which the subject vehicle 1 is traveling. In the example illustrated in FIG. 3, when the driver monitor section 3B outputs a "first classification signal (weak signal)" and outputs, for example, a "second classification signal (strong signal)" such as a face direction signal or an eyes-open signal, the prediction section 3E uses a learned machine learning model to predict whether or not a driver of the subject vehicle 1 has a lane departure intention based on a time-series signal including vehicle information, lane information, and target information, and the "first classification signal (weak signal)", and outputs a result of the prediction. That is, information based on the "weak signal" and indicating that the "driver of the subject vehicle 1 possibly has a lane departure intention" is indirectly used.

In step S10, the first determination section 3C determines whether or not the driver of the subject vehicle 1 is in the distracted state or the non-awake state based on a "second classification signal (strong signal)" output from the driver monitor section 3B. In the case of YES (in a case where the driver of the subject vehicle 1 is in the distracted state or the non-awake state), information based on the strong signal and indicating that the "driver of the subject vehicle 1 has no lane departure intention" is directly used (i.e., the estimation section 3D estimates that the driver of the subject vehicle 1 has no lane departure intention) and the processing proceeds to step S12. In the case of NO (in a case where the driver of the subject vehicle 1 is in neither the distracted state nor the non-awake state), the driver of the subject vehicle 1 is looking ahead, but it is not known whether or not the driver of the subject vehicle 1 has a lane departure intention, and the processing then proceeds to step S11.

In step S11, the second determination section 3F determines whether or not the prediction section 3E predicts that the driver of the subject vehicle 1 has a lane departure intention. In the case of YES (in a case where the prediction section 3E predicts that the driver of the subject vehicle 1 has a lane departure intention), the processing proceeds to step S13. In the case of NO (in a case where the prediction section 3E predicts that the driver of the subject vehicle 1 has no lane departure intention), the processing proceeds to step S12.

In step S12, the control section 3G causes the HMI 13 to output a lane departure alert and the LDA is activated.

In step S13, the control section 3G causes the HMI 13 to restrict an output of a lane departure alert and the LDA is deactivated. As described above, in a case where the estimation section 3D estimates that the driver of the subject vehicle 1 has no lane departure intention and the prediction section 3E concurrently predicts that the driver of the subject vehicle 1 has a lane departure intention, a result of the estimation by the estimation section 3D is prioritized and the control section 3G causes the HMI 13 to output a lane departure alert.

The definitions of the strong signal (second classification signal) and the weak signal (first classification signal) are organized in other terms as follows. The strong signal is a signal that directly makes it possible to determine whether a driver of the subject vehicle 1 is able to take departure evasive action or collision evasive action against a traveling road departure or a target collision. The weak signal is a signal that does not make it possible alone to determine whether to take the evasive action.

If based on the organization, it is possible to regard an eyes-open signal or the like as a strong signal. Specifically, if the driver is in an eyes-closed situation due to drowsiness or the like, it is not possible to expect the driver to take evasive action as a vehicle behavior of the subject vehicle 1 even though the subject vehicle 1 is about to depart from the lane in which the subject vehicle 1 is traveling.

Meanwhile, it is not possible to know, for example, from a line-of-sight direction signal or the like of a driver of the subject vehicle 1 whether, even though the driver of the subject vehicle 1 is looking in the direction or visually recognizing a target, the driver of the subject vehicle 1 may take evasive driving action to avoid the target. Such a signal is treated as a weak signal and used as one of signals input to the prediction section 3E.

Figures 4A, 4B, 4C, 4D:
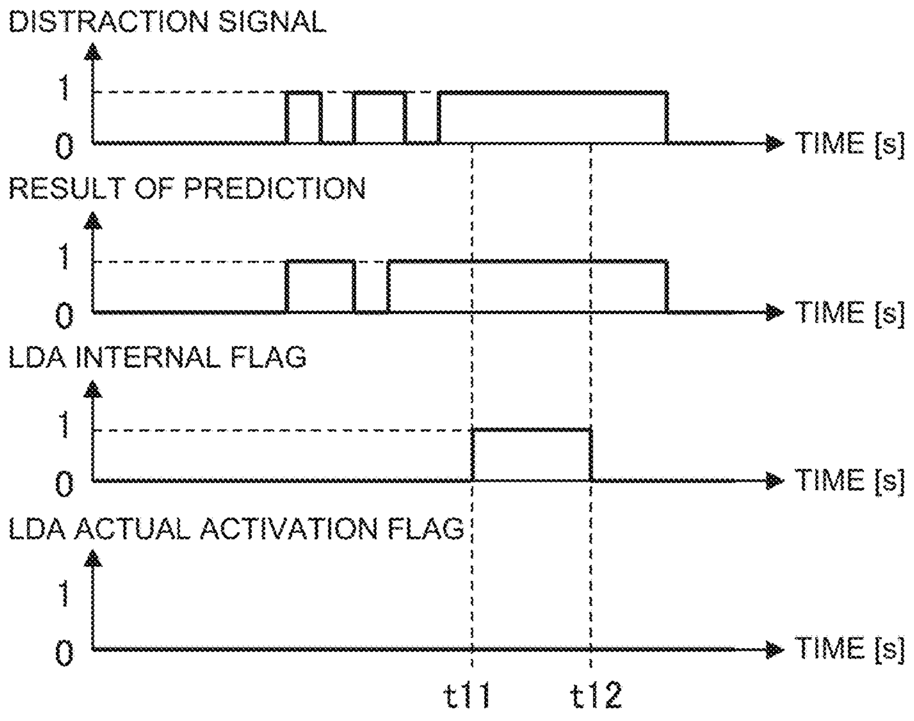
FIG. 4A is a diagram for describing an example in which a control section 3G causes an HMI 13 to restrict an output of a lane departure alert.
FIG. 4B is a diagram for describing the example in which the control section 3G causes the HMI 13 to restrict the output of the lane departure alert.
FIG. 4C is a diagram for describing the example in which the control section 3G causes the HMI 13 to restrict the output of the lane departure alert.
FIG. 4D is a diagram for describing the example in which the control section 3G causes the HMI 13 to restrict the output of the lane departure alert.

Each of FIGS. 4A, 4B, 4C, and 4D is a diagram for describing an example in which the control section 3G causes the HMI 13 to restrict an output of a lane departure alert. If described in detail, FIG. 4A illustrates a temporal change in a distraction signal output from the driver monitor section 3B, FIG. 4B illustrates a temporal change in a result of prediction by the prediction section 3E, FIG. 4C illustrates a temporal change in an LDA internal flag, and FIG. 4D illustrates a temporal change in an LDA actual activation flag (a result of control by the control section 3G). In FIG. 4A, “1” on the longitudinal axis indicates a state in which a distraction signal is output and “0” on the longitudinal axis indicates a state in which no distraction signal is output. In FIG. 4B, “1” on the longitudinal axis indicates a result of prediction indicating that a driver of the subject vehicle 1 has a lane departure intention and “0” on the longitudinal axis indicates a result of prediction indicating that a driver of the subject vehicle 1 has no lane departure intention. In FIG. 4C, “1” on the longitudinal axis indicates an LDA activation condition satisfaction state (a state in which an output of a lane departure alert is restricted) and “0” on the longitudinal axis indicates an LDA activation condition non-satisfaction state (a state in which an output of a lane departure alert is not restricted). In FIG. 4D, “1” on the longitudinal axis indicates a state in which LDA actual control is present (a state in which an output of a lane departure alert is actually restricted) and “0” on the longitudinal axis indicates a state in which LDA actual control is absent (a state in which an output of a lane departure alert is not actually restricted).

In the example illustrated in FIGS. 4A, 4B, 4C, and 4D, during the period from time t11 to time t12, the subject vehicle 1 departs from the lane in which the subject vehicle 1 is traveling and the prediction section 3E predicts that a driver of the subject vehicle 1 has a lane departure intention. The HMI 13 therefore attempts to restrict an output of a lane departure alert (the longitudinal axis in FIG. 4C becomes “1”). Meanwhile, during the period from time t11 to time t12, the driver monitor section 3B outputs a distraction signal (strong signal) and the estimation section 3D estimates that the driver of the subject vehicle 1 has no lane departure intention. The control section 3G gives priority to a result of the estimation by the estimation section 3D over a result of the prediction by the prediction section 3E and causes the HMI 13 to output a lane departure alert (the longitudinal axis in FIG. 4D becomes “0”).

As described above, in the lane departure intention estimation device 16 according to the first embodiment, signals output from the driver monitor section 3B are classified into the two of a direct signal (a strong signal or a second classification signal) and an indirect signal (a weak signal or a first classification signal). It is therefore possible to increase the accuracy of estimating whether or not a driver of the subject vehicle 1 has a lane departure intention. If described in detail, direct information such as the distracted state in which the driver of the subject vehicle 1 is not looking ahead or the non-awake state in which the driver of the subject vehicle 1 is unconscious is a strong signal directly indicating the state of the driver of the subject vehicle 1. Such a strong signal is not therefore input to the prediction section 3E, but used to override a result of prediction by the prediction section 3E. Specifically, if the driver monitor section 3B outputs a distraction signal or a non-awake signal, a result of estimation by the estimation section 3D indicating that the driver of the subject vehicle 1 has no lane departure intention is prioritized even though the prediction section 3E predicts that the driver of the subject vehicle 1 has a lane departure intention. That is, an arbitration structure is adopted in the lane departure intention estimation device 16 according to the first embodiment. The estimation section 3D directly uses a strong signal to estimate whether or not the driver of the subject vehicle 1 has a lane departure intention, thereby making high-accuracy estimation possible.

Second Embodiment

The subject vehicle 1 to which the lane departure intention estimation device 16 according to a second embodiment is applied is configured similarly to the subject vehicle 1 to which the lane departure intention estimation device 16 according to the first embodiment described above is applied except for the points described below.

In an example of the subject vehicle 1 to which the lane departure intention estimation device 16 according to the second embodiment is applied, in a case where the estimation section 3D estimates that a driver of the subject vehicle 1 has no lane departure intention when the subject vehicle 1 departs from the lane in which the subject vehicle 1 is traveling, the control section 3G causes the vehicle control device 15 to execute a lane keeping assist (e.g., a steering assist or the like). In addition, in a case where the prediction section 3E predicts that the driver of the subject vehicle 1 has no lane departure intention when the subject vehicle 1 departs from the lane in which the subject vehicle 1 is traveling, the control section 3G causes the vehicle control device 15 to execute a lane keeping assist. Meanwhile, in a case where the prediction section 3E predicts that the driver of the subject vehicle 1 has a lane departure intention when the subject vehicle 1 departs from the lane in which the subject vehicle 1 is traveling, the control section 3G causes the vehicle control device 15 to restrict the execution of a lane keeping assist.

In the example of the subject vehicle 1 to which the lane departure intention estimation device 16 according to the second embodiment is applied, in a case where the estimation section 3D estimates that the driver of the subject vehicle 1 has no lane departure intention and the prediction section 3E concurrently predicts that the driver of the subject vehicle 1 has a lane departure intention, the control section 3G gives priority to a result of the estimation by the estimation section 3D indicating that the driver of the subject vehicle 1 has no lane departure intention over a result of the prediction by the prediction section 3E indicating that the driver of the subject vehicle 1 has a lane departure intention and causes the vehicle control device 15 to execute a lane keeping assist.

Third Embodiment

The subject vehicle 1 to which the lane departure intention estimation device 16 according to a third embodiment is applied is configured similarly to the subject vehicle 1 to which the lane departure intention estimation device 16 according to the first or second embodiment described above is applied except for the points described below.

Figure 5:
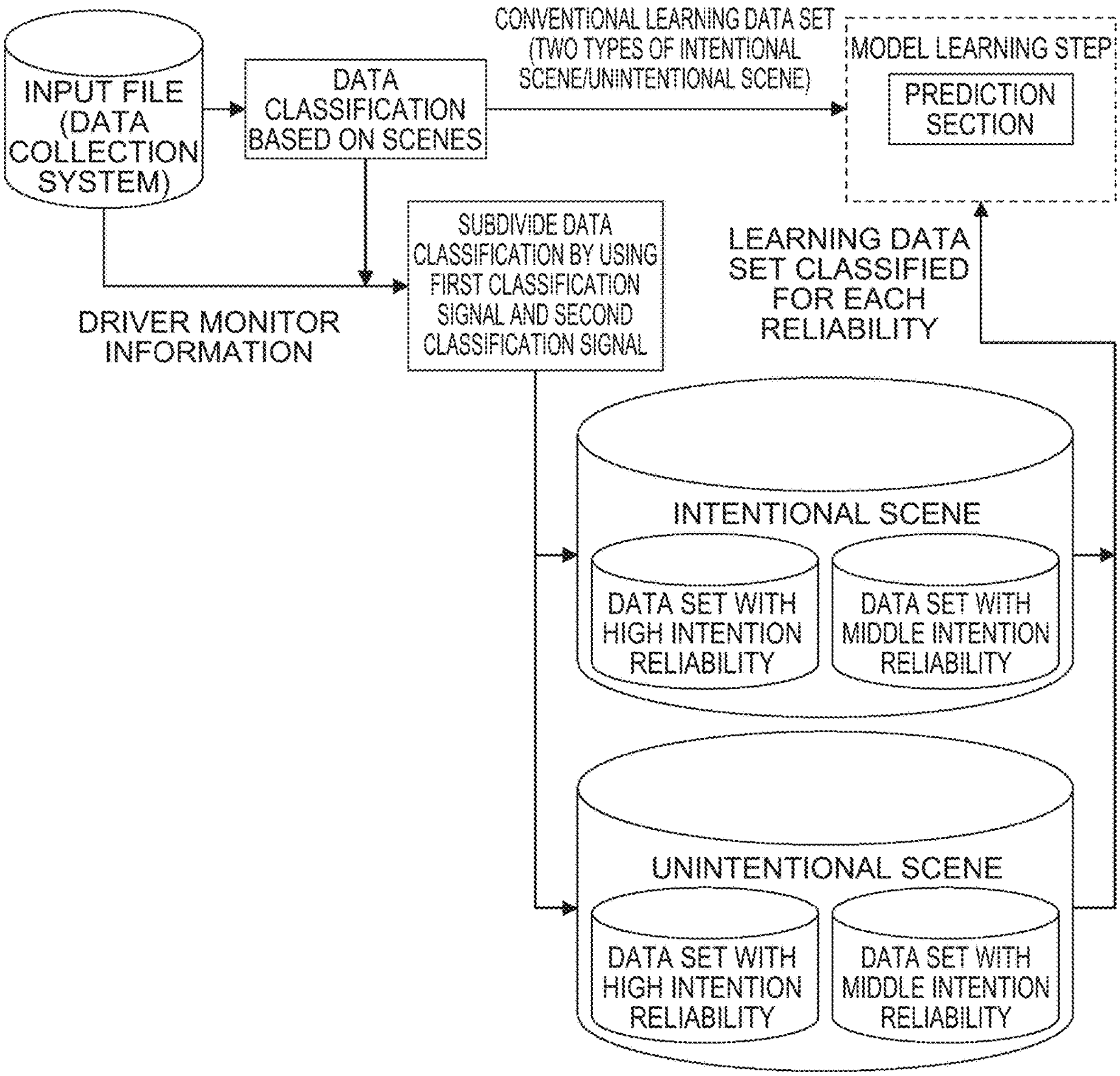
FIG. 5 is a diagram illustrating an example of data processing and a flow in the subject vehicle 1 to which the lane departure intention estimation device 16 according to a third embodiment is applied.

FIG. 5 is a diagram illustrating an example of data processing and a flow in the subject vehicle 1 to which the lane departure intention estimation device 16 according to the third embodiment is applied.

In the third embodiment, a data collection system is used that collects traveling on-line data of the subject vehicle 1 used by a driver (user) of the subject vehicle 1 (i.e., the subject vehicle 1 is used as a learning vehicle) to increase the accuracy of giving a true value to the data collected by the data collection system. The data collected by the data collection system includes a front camera image, a recognition processing result, and vehicle controller area network (CAN) information and further includes driver monitor information (information that is input to the driver monitor section 3B and information that is output from the driver monitor section 3B).

In the example illustrated in FIG. 5, a data aggregate collected by the data collection system is subjected to data classification based on scenes. In the step, a task of cutting out a scene to be learned is performed and a classification is arranged for each of the scenes based on whether the scene is a scene that is intended by a driver of the subject vehicle 1 or a scene that is not intended.

The general related art classifies learning data sets into only the two types of data sets of a scene that is intended by a driver of the subject vehicle 1 and a scene that is not intended. However, in the example illustrated in FIG. 5, the data classification is further subdivided by using the "first classification signal (weak signal)" and the "second classification signal (strong signal)" described above. For example, data accompanied by the eyes-closed state or the distracted state (strong signal) is classified into an "unintentional scene with reliability (high)". For example, in a scene in which the subject vehicle 1 overtakes a parked vehicle, the data is classified into an "intentional scene with reliability (middle)" if accompanied by a driver monitor signal (weak signal) indicating a state in which a driver of the subject vehicle 1 is visually recognizing the parked vehicle. For example, in the scene in which the subject vehicle 1 overtakes a parked vehicle, the data is classified into an "intentional scene with reliability (high)" if accompanied by the driver monitor signal (weak signal) indicating the state in which a driver of the subject vehicle 1 is visually recognizing the parked vehicle and accompanied by a blinker operation of the driver of the subject vehicle 1.

Finally, a machine learning model is learned by using a data set corresponding to reliability. For example, the frequency of occurrence in an actual scene is taken into consideration and an "intentional scene with reliability (high)", an "intentional scene with reliability (middle)", an "unintentional scene with reliability (middle)", and an "unintentional scene with reliability (high)" are used at a ratio of 1:2:2:1 to learn a machine learning model.

The general related art classifies a blinker operation into an "intentional scene" as a direct driving operation behavior of a driver of the subject vehicle 1. There is, however, left a possibility that the blinker operation is not a blinker operation for the subject vehicle 1 to avoid a parked vehicle, but a blinker operation performed because it seems more favorable that the subject vehicle 1 moves to the next lane as a result of the subject vehicle 1 wobbling with respect to the lane in which the subject vehicle 1 is traveling.

In the example illustrated in FIG. 5, the blinker operation and the information indicating that the driver of the subject vehicle 1 is visually recognizing a parked vehicle are combined. It is therefore possible to determine that the blinker operation is a blinker operation for the subject vehicle 1 to avoid the parked vehicle. As a result, it is possible to set the reliability of the intentional scene to (high).

That is, in the example illustrated in FIG. 5, to increase the accuracy of giving a true value to data collected by the data collection system that collects traveling on-line data of the subject vehicle 1 used by a driver (user) of the subject vehicle 1, the tags of the presence of an intention of the driver of the subject vehicle 1/the absence of an intention of the driver of the subject vehicle 1 are separately given depending on states in which the "first classification signal (weak signal)" and the "second classification signal (strong signal)" are output.

The example illustrated in FIG. 5 proposes a rule for giving an intention true value and proposes an increase in the accuracy of learning a machine learning model.

In a case where data acquired by the subject vehicle 1 is used as learning data of a machine learning model, the learning data requires a label (tag) indicating whether or not a driver of the subject vehicle 1 has a lane departure intention. It is preferable to give a tag by directly asking the driver himself or herself of the subject vehicle 1 whether or not the driver of the subject vehicle 1 has a lane departure intention, but it is actually difficult to ask the driver of the subject vehicle 1 whether or not the driver of the subject vehicle 1 has a lane departure intention.

Accordingly, the general related art makes a scene determination. If a scene to be determined is, for example, a parked vehicle evasive scene or a lane change scene, it is determined (considered) that the driver of the subject vehicle 1 has a lane departure intention.

In contrast, in the example illustrated in FIG. 5, a tag combined with driver monitor information is given, thereby making it possible to increase the accuracy of giving a tag of an intention estimation level. In addition, it is possible to further increase the accuracy of learning and evaluation by making an improvement of the stratified classification of an intentional scene with reliability (high) and an intentional scene with reliability (middle) corresponding to the two types of signals of a strong signal and a weak signal (such as changing the learning order or changing the ratio).

As described above, the embodiments of the lane departure intention estimation device according to the present disclosure have been described with reference to the drawings, but the lane departure intention estimation device according to the present disclosure is not limited to the embodiments described above. It is possible to make a change as appropriate within the scope that does not depart from the gist of the present disclosure. The configurations of the respective examples of the embodiments described above may be combined as appropriate. In each of the examples of the embodiments described above, the processing that is performed by the lane departure intention estimation device 16 has been described as software processing that is performed by executing a program, but the processing that is performed by the lane departure intention estimation device 16 may be processing that is performed by hardware. Alternatively, the processing that is performed by the lane departure intention estimation device 16 may be processing provided by a combination of both software and hardware. In addition, a program (a program that implements a function of the processor 163 of the lane departure intention estimation device 16) that is stored in the memory 162 of the lane departure intention estimation device 16 may be, for example, recorded in a computer-readable storage medium such as a semiconductor memory, a magnetic recording medium, or an optical recording medium, and provided or distributed, for example.

What is claimed is:

1. A lane departure intention estimation device comprising:

an estimation section that estimates that a driver of a subject vehicle has no lane departure intention in a case where the driver of the subject vehicle is in a distracted state or a non-awake state; and a prediction section that uses a learned machine learning model to predict whether or not the driver of the subject vehicle has a lane departure intention based on a time-series signal and a first classification signal in a case where the driver of the subject vehicle is in neither the distracted state nor the non-awake state, the time-series signal including vehicle information that is information regarding the subject vehicle, lane information that is information regarding a lane in which the subject vehicle is traveling, and target information that is information regarding a target present around the subject vehicle, the first classification signal including a first signal indicating that the driver of the subject vehicle is in neither the distracted state nor the non-awake state, wherein the learned machine learning model is obtained by learning in which a learning time-series signal and learning data are used, the learning time-series signal including learning vehicle information that is information regarding a learning vehicle, learning lane information that is information regarding a lane in which the learning vehicle is traveling, and learning target information that is information regarding a target present around the learning vehicle, the learning data being a data set of a learning first classification signal and a label, the learning first classification signal indicating that a driver of the learning vehicle is in neither the distracted state nor the non-awake state, the label indicating whether or not the driver of the learning vehicle has a lane departure intention, wherein the first classification signal further includes a second signal indicating a line-of-sight direction of the driver of the subject vehicle and a third signal indicating the target at which the driver of the subject vehicle is gazing, and the learning first classification signal further includes a fourth signal indicating the line-of-sight direction of the driver of the subject vehicle and a fifth signal indicating the target at which the driver of the subject vehicle is gazing; and a control section that controls the subject vehicle based on a result of the estimation by the estimation section or a result of the prediction by the prediction section.

2. The lane departure intention estimation device according to claim 1, comprising a control section that causes an output of a lane departure alert to be restricted in a case where the prediction section predicts that the driver of the subject vehicle has a lane departure intention, the lane departure alert being an alert for a lane departure of the subject vehicle.

3. The lane departure intention estimation device according to claim 1, comprising a control section that causes execution of a lane keeping assist to be restricted in a case where the prediction section predicts that the driver of the subject vehicle has a lane departure intention.

4. The lane departure intention estimation device according to claim 3, wherein the control section causes a vehicle control device to execute the lane keeping assist in a case where the prediction section predicts that the driver of the subject vehicle has no lane departure intention.

5. The lane departure intention estimation device according to claim 1, comprising a driver monitor section that outputs the first classification signal and a second classification signal based on an image captured by a driver monitor camera, the image including the driver of the subject vehicle, the first classification signal including the first signal indicating that the driver of the subject vehicle is in neither the distracted state nor the non-awake state, the second classification signal including a sixth signal indicating that the driver of the subject vehicle is in the distracted state or the non-awake state, wherein in a case where the driver monitor section outputs the second classification signal including the sixth signal indicating that the driver of the subject vehicle is in the distracted state or the non-awake state and the prediction section predicts that the driver of the subject vehicle has a lane departure intention, a result of the estimation by the estimation section is given priority over a result of the prediction by the prediction section, the result of the estimation indicating that the driver of the subject vehicle has no lane departure intention, the result of the prediction indicating that the driver of the subject vehicle has a lane departure intention.

6. The lane departure intention estimation device according to claim 5, wherein:

the first classification signal output from the driver monitor section is input to the prediction section; and the first classification signal includes a signal indicating an internal state of the driver of the subject vehicle, the internal state being estimated by the driver monitor section based on the image captured by the driver monitor camera, the image including the driver of the subject vehicle.

7. The lane departure intention estimation device according to claim 5, comprising a first determination section that determines whether or not the driver of the subject vehicle is in the distracted state or the non-awake state based on the second classification signal output from the driver monitor section.

8. The lane departure intention estimation device according to claim 5, wherein the first classification signal is a weak signal output by the driver monitor section with low reliability, and the second classification signal is a strong signal output by the driver monitor section with high reliability.

9. The lane departure intention estimation device according to claim 1, wherein:

the learning first classification signal further includes a seventh signal indicating that the driver of the subject vehicle has a high stress level.

10. The lane departure intention estimation device according to claim 1, wherein:

the learning first classification signal further includes an eighth signal indicating that the driver of the subject vehicle is in the careless state.

11. The lane departure intention estimation device according to claim 1, wherein the driver monitor section determines that the driver of the subject vehicle is gazing at a target present around the subject vehicle based on an image captured by the driver monitor camera and a result of detection by a surrounding situation sensor.

12. The lane departure intention estimation device according to claim 1, wherein the prediction section uses a hidden Markov model as the learned machine learning model.

* * * * *